United States Patent
Chujo et al.

(10) Patent No.: US 10,272,620 B2
(45) Date of Patent: Apr. 30, 2019

(54) FIBER-REINFORCED COMPOSITE MATERIAL AND METHOD FOR MANUFACTURING SAME

(71) Applicant: HONDA MOTOR CO., LTD., Tokyo (JP)

(72) Inventors: Kenichi Chujo, Tochigi-ken (JP); Shoichiro Negishi, Tochigi-ken (JP); Susumu Horinaka, Tochigi-ken (JP); Chiaki Mori, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 15/129,117

(22) PCT Filed: Mar. 16, 2015

(86) PCT No.: PCT/JP2015/057665
§ 371 (c)(1),
(2) Date: Sep. 26, 2016

(87) PCT Pub. No.: WO2015/146668
PCT Pub. Date: Oct. 1, 2015

(65) Prior Publication Data
US 2017/0106608 A1 Apr. 20, 2017

(30) Foreign Application Priority Data

Mar. 28, 2014 (JP) ................. 2014-070470

(51) Int. Cl.
*B32B 27/04* (2006.01)
*B29C 70/48* (2006.01)
(Continued)

(52) U.S. Cl.
CPC ............... *B29C 70/48* (2013.01); *B29B 11/12* (2013.01); *B29K 2105/06* (2013.01)

(58) Field of Classification Search
CPC ..... B29C 70/48; B29B 11/12; B29K 2105/06; B32B 27/12
(Continued)

(56) References Cited

U.S. PATENT DOCUMENTS

| 3,928,693 A * | 12/1975 | Rudloff | B29C 70/00 264/113 |
| 7,888,274 B2 * | 2/2011 | Tsuji | B29B 11/16 442/286 |
| 2004/0170554 A1 * | 9/2004 | Wadahara | B29B 11/16 423/447.2 |

FOREIGN PATENT DOCUMENTS

| JP | 05185539 A * | 7/1993 | ............. B29C 53/04 |
| JP | 2008-132775 | 6/2008 | |
| WO | WO-2013118534 A1 * | 8/2013 | ............. B29C 43/20 |

* cited by examiner

*Primary Examiner* — Andrew T Piziali
(74) *Attorney, Agent, or Firm* — Rankin, Hill & Clark LLP (57) ABSTRACT

A fiber-reinforced composite material and a method for manufacturing the same. A first binder resin is applied to a first portion for forming a deformed part of a fiber base material, and a second binder resin is applied to a second portion excluding the first portion. The fiber base material is then heated so that the degree of melting of the first binder resin during shaping is less than the degree of melting of the second binder resin, and the second binder resin is softened. Shaping is then performed so that a deformed part is formed in the fiber base material, and a preform is obtained. A fiber-reinforced composite material is obtained using the preform as a molding precursor.

5 Claims, 9 Drawing Sheets

(51) Int. Cl.
*B29B 11/12* (2006.01)
*B29K 105/06* (2006.01)

(58) Field of Classification Search
USPC .......................................................... 156/242
See application file for complete search history.

FIBER-REINFORCED COMPOSITE MATERIAL AND METHOD FOR MANUFACTURING SAME

TECHNICAL FIELD

The present invention relates to a fiber-reinforced composite body (material) and a method for producing (manufacturing) the same. The fiber-reinforced composite body is produced by using a preform as a molding precursor, and the preform is prepared by forming a deformed portion in a sheet of a fiber base containing a reinforcing fiber.

BACKGROUND ART

A so-called RTM (resin transfer molding) method has been known as a method for producing a fiber-reinforced composite body with excellent productivity. In the RTM method, in a shaping mold, a fiber base is impregnated with a matrix resin and then the matrix resin is hardened to produce a fiber-reinforced composite body (an FRP molded article). For example, in a case where a relatively large FRP molded article or the like is produced by the RTM method, generally the fiber base is preliminarily formed into a shape similar to a desired shape of the FRP molded article. Thus, a preform is preliminarily prepared from the fiber base as a molding precursor for producing the FRP molded article. The final product of the FRP molded article can be produced highly accurately and efficiently by placing the preform in a shaping mold and by performing the impregnation and hardening of the matrix resin as described above.

Specifically, for example, as proposed in Japanese Laid-Open Patent Publication No. 2008-132775, the preform can be prepared by integrating a sheet of a fiber base containing oriented reinforcing fiber pieces with a resin material or the like and by shaping the integrated sheet. Thus, for example, the reinforcing fiber pieces can be prevented from being separated from each other in the shaping step by adding the resin material to the fiber base to fix the reinforcing fiber pieces.

SUMMARY OF INVENTION

In the preparation of the preform, the fiber base is heated to increase the melting degree of the resin material, and then the resultant softened sheet is shaped. Thus, in the step of shaping the fiber base, the force of the resin material for binding the reinforcing fiber pieces is reduced. Therefore, in the shaping step, the orientation of the reinforcing fiber pieces is disturbed relatively readily in a portion deformed at a higher deformation ratio (processing ratio) such as a portion of the fiber base bent at a tight angle. Consequently, the distances between the reinforcing fiber pieces may be made non-uniform, and twisting or widening may be caused in the preform, whereby the mechanical strength, the designed appearance, and the like may be deteriorated in the final product of the FRP molded article.

A principal object of the present invention is to provide a fiber-reinforced composite body, which is obtained by using a preform as a molding precursor, reinforcing fiber orientation disturbance being prevented in the preform to improve the mechanical strength and the designed appearance.

Another object of the present invention is to provide a method for producing the fiber-reinforced composite body.

According to an aspect of the present invention, there is provided a method for producing a fiber-reinforced composite body comprising an application step of applying a binder resin to a sheet of a fiber base containing a reinforcing fiber, a heating step of heating the fiber base with the applied binder resin to soften the binder resin, and a shaping step of forming a deformed portion in the heated fiber base to prepare a preform as a molding precursor, wherein in the shaping step, the melting degree of the binder resin applied to a first portion corresponding to the deformed portion in the fiber base is lower than that of the binder resin applied to a second portion other than the first portion in the fiber base.

As described above, in the shaping step of shaping the fiber base to prepare the preform, the first portion in the fiber base is deformed at a higher deformation ratio than the second portion, whereby the orientation of the reinforcing fiber pieces is disturbed relatively readily in the first portion. However, in the fiber-reinforced composite body production method of the present invention, since the melting degree of the binder resin applied to the first portion is lower than that of the binder resin applied to the second portion in the shaping step, the force of the binder resin for binding the reinforcing fiber pieces is larger in the first portion in the shaping step. Therefore, the reinforcing fiber orientation disturbance can be effectively prevented in the first portion. In addition, since the force of the binder resin for binding the reinforcing fiber pieces is smaller in the second portion than in the first portion, deterioration of the formability of the fiber base can be prevented.

Thus, the reinforcing fiber orientation disturbance can be effectively prevented while good formability of the fiber base is maintained. Consequently, the fiber base can be shaped into a desired shape accurately to prepare the preform, and the reinforcing fiber pieces can be oriented approximately uniformly in the preform. By using the preform as the molding precursor, the fiber-reinforced composite body can be efficiently produced with excellent mechanical strength and designed appearance.

For example, even in a case where the fiber base is prepared from a non-woven fabric or the like and therefore the reinforcing fiber pieces are randomly oriented, the reinforcing fiber orientation disturbance, for example a non-uniform distribution of the reinforcing fiber pieces in the fiber base can be effectively prevented. Thus, in the fiber-reinforced composite body production method, even if the reinforcing fiber pieces are oriented in one direction or a plurality of directions (or randomly) in the fiber base, the distance therebetween and the distribution thereof can be prevented from becoming non-uniform. Therefore, the reinforcing fiber pieces can be oriented approximately uniformly, and the fiber base can be shaped into a desired shape accurately to prepare the preform. Consequently, the fiber-reinforced composite body can be efficiently produced with the excellent mechanical strength and designed appearance regardless of whether the reinforcing fiber is a continuous fiber, a long fiber, a short fiber, or the like and whether the fiber base is a UD material, a woven fabric (a cloth material), a non-woven fabric, or the like.

In the fiber-reinforced composite body production method, it is preferred that a first binder resin is applied as the above binder resin to the first portion in the fiber base, a second binder resin is applied as the above binder resin to at least the second portion in the fiber base, and the second binder resin has a softening point lower than that of the first binder resin in the application step, and the fiber base is heated in the heating step in such a manner that the fiber base has a temperature lower than the softening point of the first binder resin and higher than the softening point of the second binder resin in the shaping step.

In this case, the first binder resin and the second binder resin have the different softening points, whereby in the shaping step, the melting degree of the binder resin applied to the first portion is lower than that of the binder resin applied to the second portion. Specifically, the first binder resin, which has a softening point higher than that of the second binder resin, is applied to the first portion. Then, the fiber base is heated in the heating step in such a manner that the second binder resin is sufficiently softened while a sufficient force of the first binder resin for binding the reinforcing fiber pieces in the shaping step is maintained.

Thus, the melting degree of the binder resin can be suitably controlled in each of the first portion and the second portion. Consequently, the reinforcing fiber orientation disturbance can be effectively prevented while preventing the deterioration of the formability of the fiber base, so that the fiber base can be accurately formed into a desired shape to prepare the preform containing the approximately uniformly oriented reinforcing fiber pieces.

In the fiber-reinforced composite body production method, it is preferred that the first binder resin is applied to a part of the first portion in the fiber base in the application step. In this case, for example, dots of the first binder resin are deposited on the first portion, so that the reinforcing fiber pieces in the first portion can be partly bound to prevent the orientation disturbance. Thus, the orientation disturbance can be prevented while sufficient formability of the first portion is maintained. Therefore, the fiber base can be shaped more accurately and easily to prepare the preform containing the approximately uniformly oriented reinforcing fiber pieces. In addition, the amount of the first binder resin required for preparing the fiber-reinforced composite body can be reduced.

In the fiber-reinforced composite body production method, it is preferred that in the application step, after the first binder resin is applied to the first portion in the fiber base, the second binder resin is applied to both of the first portion and the second portion. In this case, the second binder resin is applied also to the first binder resin deposited on the first portion, and thus is applied to the entire surface of the fiber base. Therefore, for example, in a case where a plurality of the fiber bases are stacked to prepare the preform, the second binder resin can be effectively interposed between the stacked fiber bases. Thus, the second binder resin can be heated to a temperature equal to or higher than the softening point and appropriately softened in the heating step, whereby the stacked fiber bases can be bonded more successfully. Consequently, the fiber bases can be shaped more accurately and easily to prepare the preform containing the approximately uniformly oriented reinforcing fiber pieces.

In the fiber-reinforced composite body production method, it is preferred that the second binder resin, which is applied to the fiber base in the application step, has stiffness higher than that of the first binder resin after hardening. In this case, even when the first portion is deformed at a high deformation ratio to prepare the preform, the spring-back can be effectively prevented because the first binder resin on the first portion is covered with the second binder resin with the higher stiffness. Consequently, the preform having the desired shape can be prepared more accurately and easily.

In the fiber-reinforced composite body production method, it is preferred that the preform is placed in a cavity of a shaping mold, the preform is impregnated with a matrix resin having a temperature lower than the softening points of the first binder resin and the second binder resin, the matrix resin is hardened, and the shaping mold is removed to obtain the fiber-reinforced composite body. In this case, also in the step of molding the preform in the shaping mold, reduction of the force of the first binder resin and the second binder resin for binding the reinforcing fiber pieces can be prevented. Therefore, the reinforcing fiber orientation disturbance can be prevented more effectively. Thus, the fiber-reinforced composite body containing the approximately uniformly oriented reinforcing fiber pieces can be efficiently produced with the excellent mechanical strength and designed appearance.

In the fiber-reinforced composite body production method, in the heating step, the first portion in the fiber base may be heated at a first temperature and the second portion in the fiber base may be heated at a second temperature higher than the first temperature. In this case, the first portion and the second portion are heated at different heating temperatures in the heating step, whereby the melting degree of the binder resin applied to the first portion is lower than that of the binder resin applied to the second portion in the shaping step. Specifically, in the heating step, the first portion is heated at the first temperature, at which the force of the binder resin for binding the reinforcing fiber pieces can be maintained. Meanwhile, the second portion is heated at the second temperature, at which the binder resin can be softened to achieve the sufficient formability.

Therefore, in the shaping step, the reinforcing fiber orientation disturbance can be effectively prevented in the first portion due to the binding force of the binder resin while the sufficient formability of the fiber base is maintained. Thus, the melting degree of the binder resin can be efficiently controlled in each of the first portion and the second portion, whereby the fiber base can be shaped accurately and easily to prepare the preform containing the approximately uniformly oriented reinforcing fiber pieces. Consequently, the fiber-reinforced composite body having the excellent mechanical strength and designed appearance can be efficiently produced.

In the fiber-reinforced composite body production method, it is preferred that the preform is placed in a cavity (28) of a shaping mold, the preform is impregnated with a matrix resin having a temperature lower than the second temperature, the matrix resin is hardened, and the shaping mold is removed to obtain the fiber-reinforced composite body. In this case, also in the step of molding the preform in the shaping mold, reduction of the force of the binder resin for binding the reinforcing fiber pieces can be prevented. Therefore, the reinforcing fiber orientation disturbance can be prevented more effectively in the first portion and the second portion. Thus, the fiber-reinforced composite body containing the approximately uniformly oriented reinforcing fiber pieces can be efficiently produced with the excellent mechanical strength and designed appearance.

In the fiber-reinforced composite body production method, it is preferred that between the application step and the heating step, a plurality of the fiber bases with the applied binder resin are stacked to prepare a stack in a stacking step. Even in a case where a plurality of the fiber bases are used to prepare the preform, the reinforcing fiber orientation disturbance in the first portion and the reduction of the formability can be prevented in each of the fiber bases in this manner. Consequently, the preform containing the approximately uniformly oriented reinforcing fiber pieces can be prepared by shaping the stack of the fiber bases accurately, and the resultant fiber-reinforced composite body can have a more excellent mechanical strength.

According to another aspect of the present invention, there is provided a fiber-reinforced composite body obtained from a molding precursor of a preform, wherein the preform is prepared by forming a deformed portion in a sheet of a fiber base containing an oriented reinforcing fiber, the deformed portion contains a first binder resin, and at least a portion other than the deformed portion contains a second binder resin having a softening point lower than that of the first binder resin.

The first binder resin is applied to a first portion in the fiber base, in which the deformed portion is formed. The second binder resin is applied to a second portion other than the first portion. Then, the fiber base is shaped together with the applied binder resins to obtain the fiber-reinforced composite body. Since the first binder resin has a softening point higher than that of the second binder resin, the binding force of the first binder resin in the first portion is larger than the binding force of the second binder resin in the second portion in the step of shaping the fiber base.

Therefore, the reinforcing fiber orientation disturbance can be effectively prevented in the first portion, and sufficient formability can be achieved in the second portion. Thus, even in a case where the first portion is deformed at a high deformation ratio in the shaping step, the reinforcing fiber orientation disturbance can be effectively prevented in the first portion while the sufficient formability of the fiber base is maintained. Consequently, the preform containing approximately uniformly oriented reinforcing fiber pieces can be used as the molding precursor, whereby the final product fiber-reinforced composite body of the present invention can exhibit improved mechanical strength and designed appearance.

In the fiber-reinforced composite body, it is preferred that the deformed portion partially contains the first binder resin. In this case, for example, dots of the first binder resin are deposited on the first portion, and the resultant fiber base is used to produce the fiber-reinforced composite body. The preform can be prepared by shaping the fiber base while maintaining the sufficient formability and preventing the reinforcing fiber orientation disturbance in the first portion. Consequently, the fiber-reinforced composite body of the present invention can be obtained with the excellent mechanical strength and designed appearance by accurately molding the preform.

In the fiber-reinforced composite body production method, it is preferred that the first binder resin in the deformed portion is covered with the second binder resin. In this case, for example, in the step of stacking a plurality of the fiber bases to prepare the preform, the second binder resin can be effectively interposed between the stacked fiber bases. Therefore, the preform containing the approximately uniformly oriented reinforcing fiber pieces can be accurately molded to produce the fiber-reinforced composite body. Consequently, the fiber-reinforced composite body can exhibit the excellent mechanical strength and designed appearance.

In the fiber-reinforced composite body, it is preferred that the second binder resin has stiffness higher than that of the first binder resin. In this case, even when the first portion is deformed at a high deformation ratio to prepare the preform, the spring-back can be effectively prevented because the first binder resin on the first portion is covered with the second binder resin with the higher stiffness. Consequently, the preform can be molded more accurately, and the resultant fiber-reinforced composite body can exhibit the excellent mechanical strength and designed appearance.

It is preferred that the fiber-reinforced composite body further contains a matrix resin having a molding temperature lower than the softening points of the first binder resin and the second binder resin. The molding temperature means a temperature at which the matrix resin can be injected into the preform for impregnation. In the case where the matrix resin has a molding temperature lower than the softening points of the first binder resin and the second binder resin, reduction of the force of the first binder resin and the second binder resin for binding the reinforcing fiber pieces can be prevented in the step of injecting or introducing the matrix resin. Therefore, the reinforcing fiber orientation disturbance can be prevented more effectively in the first portion and the second portion. Thus, the fiber-reinforced composite body can be produced by accurately molding the preform containing the approximately uniformly oriented reinforcing fiber pieces and thereby can exhibit the excellent mechanical strength and designed appearance.

DESCRIPTION OF EMBODIMENTS

A preferred embodiment of the fiber-reinforced composite body of the present invention will be described in detail below in relation with a method for producing the same with reference to the accompanying drawings.

Figure 1:
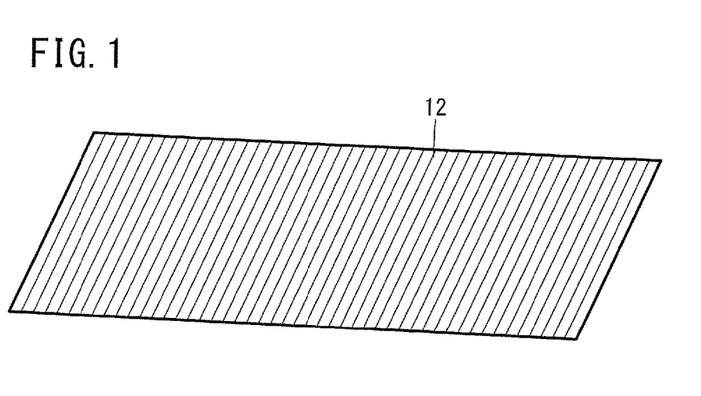
FIG. 1 is a schematic structural view of a fiber base for producing a fiber-reinforced composite body according to an embodiment of the present invention.
Figure 7:
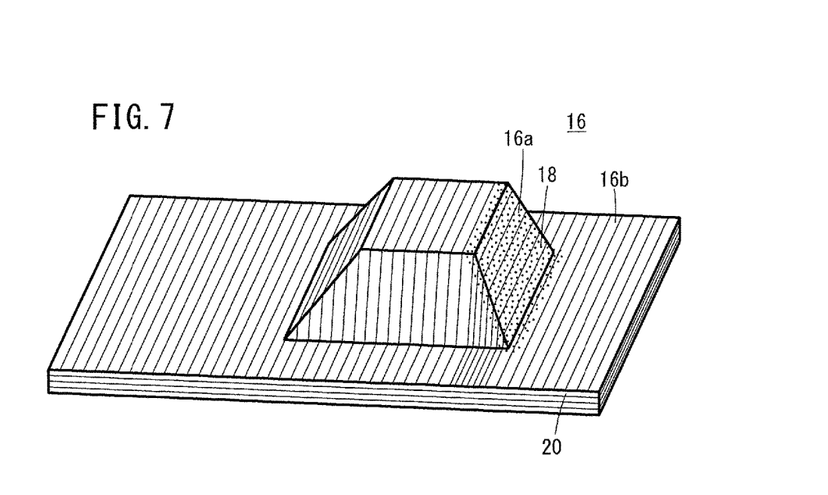
FIG. 7 is a schematic structural view of a preform shaped in the shaping mold of FIG. 6.
Figure 8:
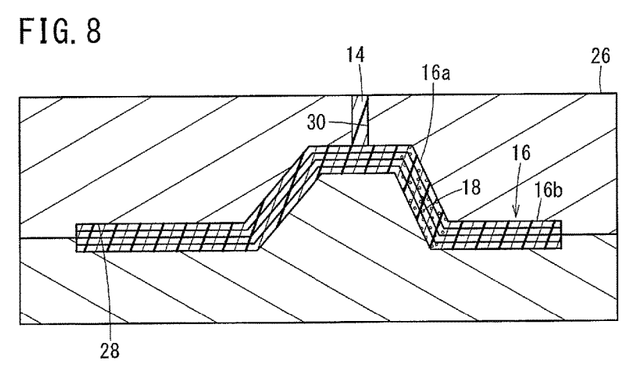
FIG. 8 is an explanatory view for illustrating a step of impregnating the preform of FIG. 7 with a matrix resin in a shaping mold.
Figure 9:
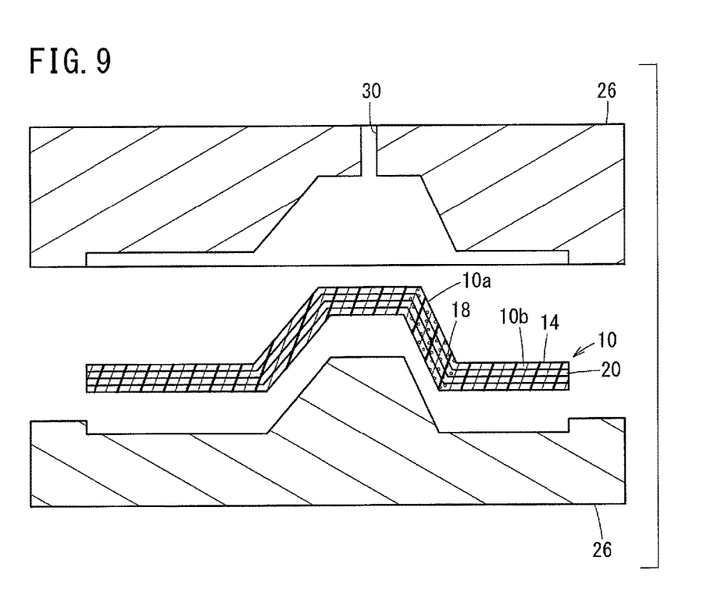
FIG. 9 is a schematic structural view of the fiber-reinforced composite body isolated from the shaping mold of FIG. 8.

As shown in FIGS. 1 to 9, a fiber-reinforced composite body 10 according to this embodiment (see FIG. 9) contains a plurality of fiber bases 12 and the matrix resin 14 (see FIGS. 1, 9, etc.). Each of the fiber bases 12 is a UD material sheet containing a reinforcing fiber of continuous fiber pieces oriented in one direction. The reinforcing fiber in the fiber base 12 is not limited to the continuous fiber, and may be a long fiber or a short fiber. The orientation of the fiber pieces of the reinforcing fiber is not limited to the one direction, and the reinforcing fiber pieces may be oriented in a plurality of directions, e.g. in random directions. Thus, the fiber base may be a woven fabric (cloth material) or a non-woven fabric.

Examples of preferred materials for the reinforcing fiber include carbon fibers, glass fibers, and resin fibers. Examples of preferred materials for the matrix resin 14 include epoxy resins, polyamide resins, and phenol resins.

Though a plurality of the fiber bases 12 are stacked to obtain the fiber-reinforced composite body 10, only one fiber base 12 may be used. Thus, the fiber-reinforced composite body may be produced from a sheet of the fiber base 12.

The fiber-reinforced composite body 10 is produced by using, as a molding precursor, a preform 16 prepared by forming a deformed portion 16a in the fiber base 12 (see FIG. 7). The deformed portion 16a is a portion deformed at a higher deformation ratio (processing ratio) as compared with the other portion 16b in the preform 16.

The preform 16 is prepared by preliminarily forming the fiber base 12 into a shape similar to the desired shape of the fiber-reinforced composite body 10. Therefore, the fiber-reinforced composite body 10 has a deformed portion 10a and the other portion 10b corresponding to the deformed portion 16a and the other portion 16b of the preform 16 (see FIG. 9). The other portion 10b is deformed at a lower deformation ratio as compared with the deformed portion 10a.

The deformed portion 10a of the fiber-reinforced composite body 10 contains a first binder resin 18, and the deformed portion 10a and the other portion 10b contain a second binder resin 20 (see FIG. 3) and the matrix resin 14. The first binder resin 18 is contained in a part of the deformed portion 10a, and for example, dots of the first binder resin 18 are deposited on the deformed portion 10a. The first binder resin 18 is covered with the second binder resin 20. The second binder resin 20 has stiffness higher than that of the first binder resin 18. The stiffness of the first binder resin 18 and the second binder resin 20 can be controlled by changing the amount of a crosslinking agent added to the resin, etc. Thus, for example, the second binder resin 20 having the higher stiffness can be prepared by adding a larger amount of the crosslinking agent to the second binder resin 20 in comparison with the first binder resin 18.

The second binder resin 20 has a softening point lower in temperature than that of the first binder resin 18. A molding temperature at which the matrix resin 14 is injected for impregnation is lower than the softening points of the first binder resin 18 and the second binder resin 20. The first binder resin 18 and the second binder resin 20 are made of resin that can be bonded to the matrix resin 14 with excellent adhesion. For example, in the case of using an epoxy resin as the matrix resin 14, it is preferred that also the first binder resin 18 and the second binder resin 20 are epoxy resins. In this case, for example, the softening point of the first binder resin 18, the softening point of the second binder resin 20, and the injection/impregnation temperature (molding temperature) of the matrix resin 14 may be 160° C., 120° C., and 110° C., respectively. The softening points can be controlled by changing the type of the epoxy resin, the ratio of a substituent to the epoxy resin, etc.

Figure 2:
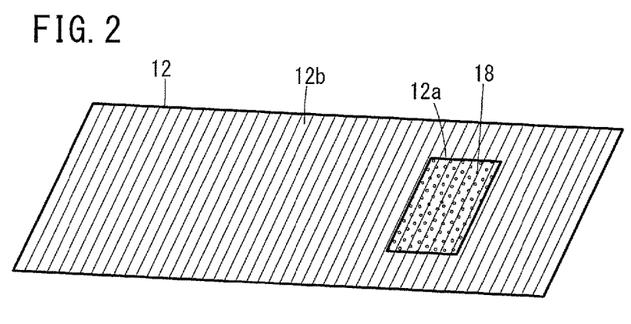
FIG. 2 is a schematic structural view of a first binder resin applied to a first portion in the fiber base of FIG. 1.

A method for producing the fiber-reinforced composite body 10 will be described below. First, as shown in FIG. 1, an application step of applying the first binder resin 18 and the second binder resin 20 to a surface of the fiber base 12 is carried out. In this application step, as shown in FIG. 2, the first binder resin 18 is applied to a first portion 12a of the fiber base 12. When the fiber base 12 is shaped to become the preform 16, the first portion 12a forms the deformed portion 16a.

Specifically, for example, a plurality of dots of the first binder resin 18 are applied to the first portion 12a. To achieve such application, for example, a so-called thermal spraying process may be carried out. The thermal spraying melts a powder of the first binder resin 18 using hot air and sprays the first portion 12a with a melted powder. As another application process, for example, the powder of the first binder resin 18 may be dissolved in a solvent, and the first portion 12a may be sprayed with the resultant solution. In this process, it is preferred that the mixing ratio of the first binder resin 18 powder and the solvent is selected to control the viscosity of the solution in such a manner that the applied solution does not flow on the first portion 12a.

Figure 3:
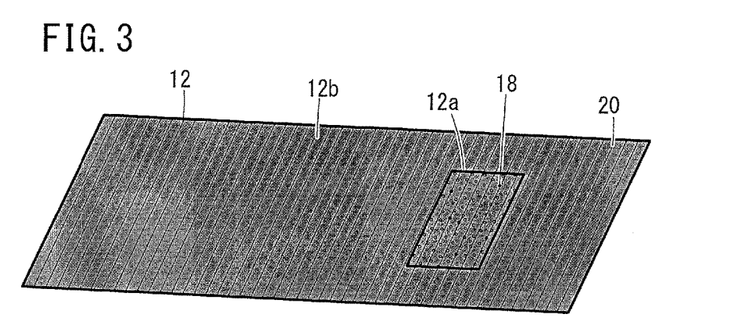
FIG. 3 is a schematic structural view of a second binder resin applied to the first portion and a second portion in the fiber base of FIG. 2.

In the application step, then, as shown in FIG. 3, the second binder resin 20 is applied to the first portion 12a and the second portion 12b (the portion other than the first portion 12a) of the fiber base 12. Thus, the second binder resin 20 may be applied by a known method to the entire surface of the fiber base 12 and thus also to the first binder resin 18 in the first portion 12a. For example, a powder of the second binder resin 20 may be dissolved in a solvent, and the resultant solution may be sprayed into the surface. Alternatively, the powder of the second binder resin 20 may be thermally melted and sprayed.

Figure 4:
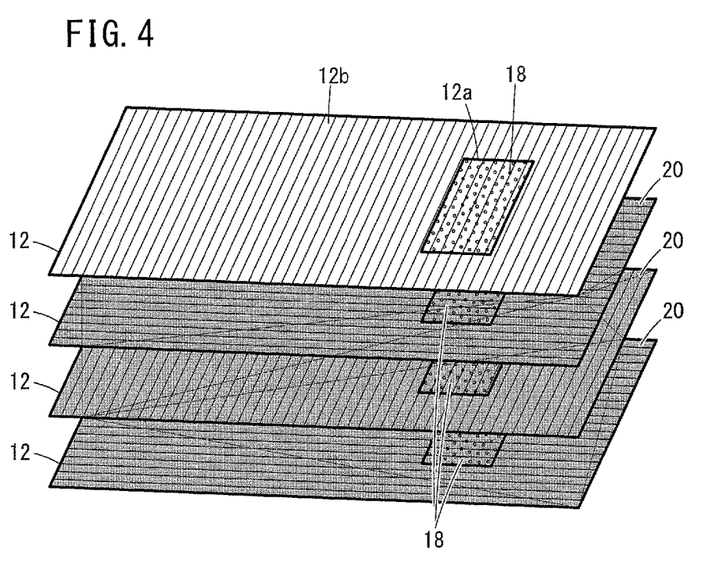
FIG. 4 is an explanatory view for illustrating a step of stacking a plurality of the fiber bases of FIG. 3.
Figure 5:
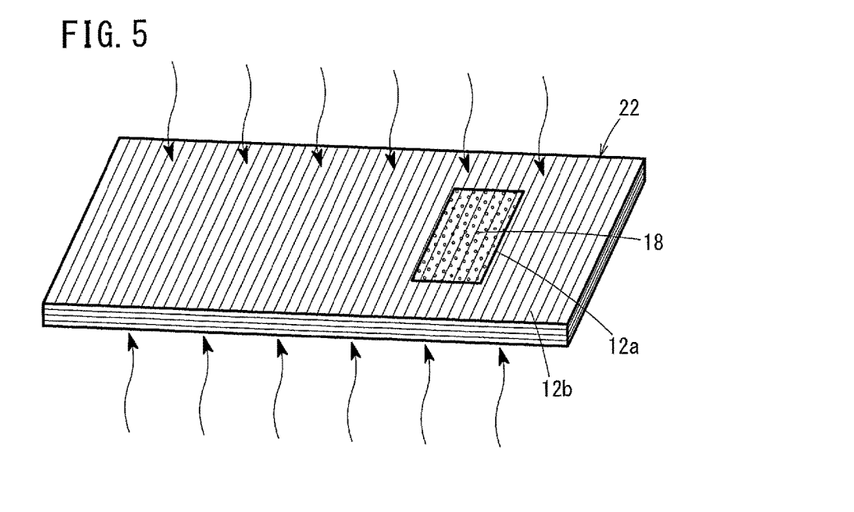
FIG. 5 is an explanatory view for illustrating a step of heating a stack prepared by stacking a plurality of the fiber bases of FIG. 4.

Then, as shown in FIGS. 4 and 5, in a stacking step, a plurality of the fiber bases 12 with the first binder resin 18 and the second binder resin 20 applied are stacked to prepare a stack 22. In this step, for example, the fiber bases 12 adjacent to each other in the stacking direction are arranged in such a manner that the reinforcing fiber orientation of each fiber base is perpendicular to each other. When the second binder resin 20 is interposed between the adjacent fiber bases 12 in the stack 22, the adjacent fiber bases 12 can be desirably bonded to each other. Because outer surfaces of the fiber bases 12 at both ends in the stacking direction of the stack 22 do not form an interlayer of the stack 22, it is not necessary to apply the second binder resin 20 to the outer surfaces.

Next, as shown in FIG. 5, the stack 22 (the fiber bases 12) is heated by a heating furnace or the like (not shown) to soften the second binder resin 20 in a heating step. Thus, the heating temperature in the heating step is lower than the softening point of the first binder resin 18 and higher than the softening point of the second binder resin 20. As a result, the second binder resin 20 can be softened to improve the formability of the fiber base 12 while a sufficient force of the first binder resin 18 for binding the reinforcing fiber pieces in the first portion 12a is maintained.

Figure 6:
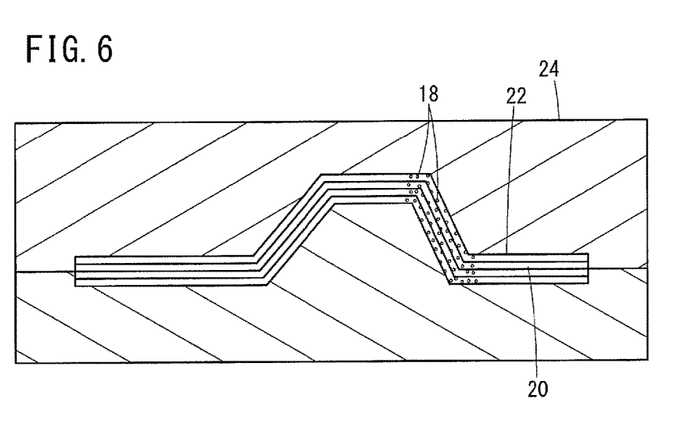
FIG. 6 is an explanatory view for illustrating a step of shaping the heated stack of FIG. 5 in a shaping mold.

As shown in FIG. 6, the heated stack 22 is shaped in the shaping mold 24 to prepare the preform 16 in a shaping step. The shaping mold 24 has a shape capable of forming the stack 22 into a shape similar to the final shape of the fiber-reinforced composite body 10. Thus, the preform 16 having the deformed portion 16a and the other portion 16b shown in FIG. 7 can be prepared by shaping the stack 22 in the shaping mold 24 and by removing the shaping mold 24.

As described above, in the stack 22 heated in the heating step, the melting degree of the first binder resin 18 applied to the first portion 12a in each fiber base 12 is lower than that of the second binder resin 20 applied to the second portion 12b.

Thus, the force of the first binder resin 18 for binding the reinforcing fiber pieces is sufficiently large in the first portion 12a. Therefore, even when the stack 22 is deformed in the shaping step, disturbance of the reinforcing fiber orientation can be effectively prevented. In addition, since the second binder resin 20 is sufficiently softened, the force of the second binder resin 20 for binding the reinforcing fiber pieces is sufficiently small in the second portion 12b. Therefore, deterioration of the formability of the stack 22 can be prevented.

In other words, the reinforcing fiber orientation disturbance can be effectively prevented while the satisfactory formability of the stack 22 is maintained. Consequently, the stack 22 can be shaped into a desired shape accurately to prepare the preform 16 containing the approximately uniformly oriented reinforcing fiber pieces.

Furthermore, as described above, the first binder resin 18 is applied to a part of the first portion 12a in the fiber base 12 in the application step. Therefore, the reinforcing fiber pieces are partially bound in the first portion 12a in the shaping step, so that the orientation disturbance can be prevented while the satisfactory formability of the first portion 12a is maintained. Consequently, the stack 22 can be shaped more accurately and easily to prepare the preform 16 containing the approximately uniformly oriented reinforcing fiber pieces.

In addition, as described above, the second binder resin 20 is applied to the entire surface of the fiber base 12 including the first binder resin 18 applied to the first portion 12a in the application step. Therefore, the second binder resin 20 can be effectively interposed between the fiber bases 12 in the stack 22 in the step of preparing the preform 16 from the stack 22. Consequently, the fiber bases 12 in the stack 22 can be bonded to each other with more excellent adhesion by the softened second binder resin 20.

The second binder resin 20, with which the first portion 12a and the applied first binder resin 18 are covered, has stiffness higher than that of the first binder resin 18. Therefore, even when the first portion 12a is deformed at a high deformation ratio to prepare the preform 16 in the shaping step, the spring-back can be effectively prevented. Consequently, the preform 16 having the desired shape can be prepared more accurately and easily.

As shown in FIG. 8, the preform 16 is placed in a cavity 28 of a shaping mold 26, and the matrix resin 14 is added through a resin inlet 30 connected to the cavity 28. In this step, air in the cavity 28 may be sucked. The reinforcing fiber in the preform 16 is impregnated with the matrix resin 14 in this manner. Then, the matrix resin 14 is hardened by cooling, chemical reaction, etc. Finally, the shaping mold 26 is removed to obtain the fiber-reinforced composite body 10.

As described above, the fiber-reinforced composite body 10 is produced by accurately shaping the stack 22 into a shape similar to the final shape of the fiber-reinforced composite body 10 to prepare the preform 16 containing the approximately uniformly oriented reinforcing fiber pieces as the molding precursor. Therefore, the fiber-reinforced composite body 10 having excellent mechanical strength and designed appearance can be efficiently produced.

Furthermore, as described above, the molding temperature of the matrix resin 14 is lower than the softening points of the first binder resin 18 and the second binder resin 20. Therefore, when the preform 16 is impregnated with the matrix resin 14, the reduction of the force of the first binder resin 18 and the second binder resin 20 for binding the reinforcing fiber pieces can be prevented. Consequently, the reinforcing fiber orientation disturbance can be prevented more effectively, so that the fiber-reinforced composite body 10 containing the approximately uniformly oriented reinforcing fiber pieces can be efficiently produced with the excellent mechanical strength and designed appearance.

The present invention is not particularly limited to the above embodiments, and various changes and modifications may be made therein without departing from the scope of the invention.

For example, although the first binder resin 18 and the second binder resin 20 having different softening points are applied to the first portion 12a and the second portion 12b in the fiber base 12 in the above embodiment, the same binder resin may be applied to the surface of the fiber base 12 including the first portion 12a and the second portion 12b. In this case, the melting degree of the binder resin applied to the first portion 12a can be made lower than that of the binder resin applied to the second portion 12b by heating the first portion 12a and the second portion 12b at different temperatures in the heating step.

Specifically, in the heating step, the first portion 12a is heated at a first temperature, at which the force of the binder resin for binding the reinforcing fiber pieces can be maintained. Meanwhile, the second portion 12b is heated at the second temperature, at which the binder resin can be softened to achieve the satisfactory formability of the fiber base 12. Thus, the second temperature is higher than the first temperature. Therefore, in the shaping step, the reinforcing fiber orientation disturbance can be effectively prevented in the first portion 12a due to the binding force of the binder resin while the satisfactory formability of the fiber base 12 is maintained.

Thus, the melting degree of the binder resin can be efficiently controlled in each of the first portion 12a and the second portion 12b, whereby the fiber base can be shaped accurately and easily to prepare the preform containing the approximately uniformly oriented reinforcing fiber pieces. Consequently, the fiber-reinforced composite body having the excellent mechanical strength and designed appearance can be efficiently produced.

In addition, in this case, it is preferred that the fiber-reinforced composite body is produced by the steps of placing the preform in the cavity 28 of the shaping mold 26, impregnating the preform with the matrix resin 14 having a temperature lower than the first and second temperatures, hardening the matrix resin 14, and removing the shaping mold 26. The reduction of the force of the binder resin for binding the reinforcing fiber pieces can be prevented also in the step of molding the preform in the shaping mold 26.

The invention claimed is:

1. A fiber-reinforced composite body obtained from a molding precursor of a preform,
   wherein
   the preform is prepared by forming a deformed portion in a sheet of a fiber base containing an oriented reinforcing fiber,
   only the deformed portion contains a first binder resin, and
   at least a portion other than the deformed portion contains a second binder resin having a softening point lower than that of the first binder resin.

2. The fiber-reinforced composite body according to claim 1, wherein
   the deformed portion partially contains the first binder resin.

3. The fiber-reinforced composite body according to claim 1, wherein
   the first binder resin in the deformed portion is covered with the second binder resin.

4. The fiber-reinforced composite body according to claim 3, wherein
   the second binder resin has stiffness higher than that of the first binder resin.

5. The fiber-reinforced composite body according to claim 1, wherein
   the fiber-reinforced composite body further contains a matrix resin having a molding temperature lower than the softening points of the first binder resin and the second binder resin.

* * * * *